219-121 SR

1/25/83 OR 4,370,542

United States Patent [19]

Mills et al.

[11] 4,370,542

[45] Jan. 25, 1983

[54] CABLE MARKING METHOD AND APPARATUS

[75] Inventors: John B. Mills, Yeovil; Christopher H. Roberts, Crewkerne, both of England

[73] Assignee: Westland Aircraft Limited, Yeovil, England

[21] Appl. No.: 264,847

[22] Filed: May 18, 1981

[30] Foreign Application Priority Data

May 22, 1980 [GB] United Kingdom ................ 8016933

[51] Int. Cl.[3] ......................... B23K 9/00; B41F 17/00

[52] U.S. Cl. ................................ 219/121 LH; 101/4; 101/35; 101/426; 226/196; 219/121 LJ

[58] Field of Search ................ 101/4, 35, 36, 37, 172, 101/426; 346/76 L; 226/196; 219/121 LH, 121 LJ, 121 L, 121 LM

[56] References Cited

U.S. PATENT DOCUMENTS 3,491,561 1/1970 Crump .......................... 101/172 X 4,029,006 6/1977 Mercer ................................ 101/35

FOREIGN PATENT DOCUMENTS 55-890 4/1980 Japan .................................. 101/35

*Primary Examiner*—Clifford D. Crowder

*Attorney, Agent, or Firm*—Larson and Taylor

[57] ABSTRACT

A method for marking an identification at pre-selected intervals along a length of cable by laser marking device comprises the steps of sequentially moving longitudinally spaced-apart portions of the cable along a marking platen and positioning and operating the laser to mark the stationary cable portion while the other cable portion is being moved. In a preferred embodiment of the cable marking apparatus, each of a plurality of cables is routed across a marking platen, down through a downstream aperture, up through an upstream aperture to form a slack loop beneath the platen and back across the platen so that the longitudinally spaced-apart portions are located in parallel juxtaposed relationship across the platen.

16 Claims, 7 Drawing Figures

CABLE MARKING METHOD AND APPARATUS

DESCRIPTION OF INVENTION

Figure 1:
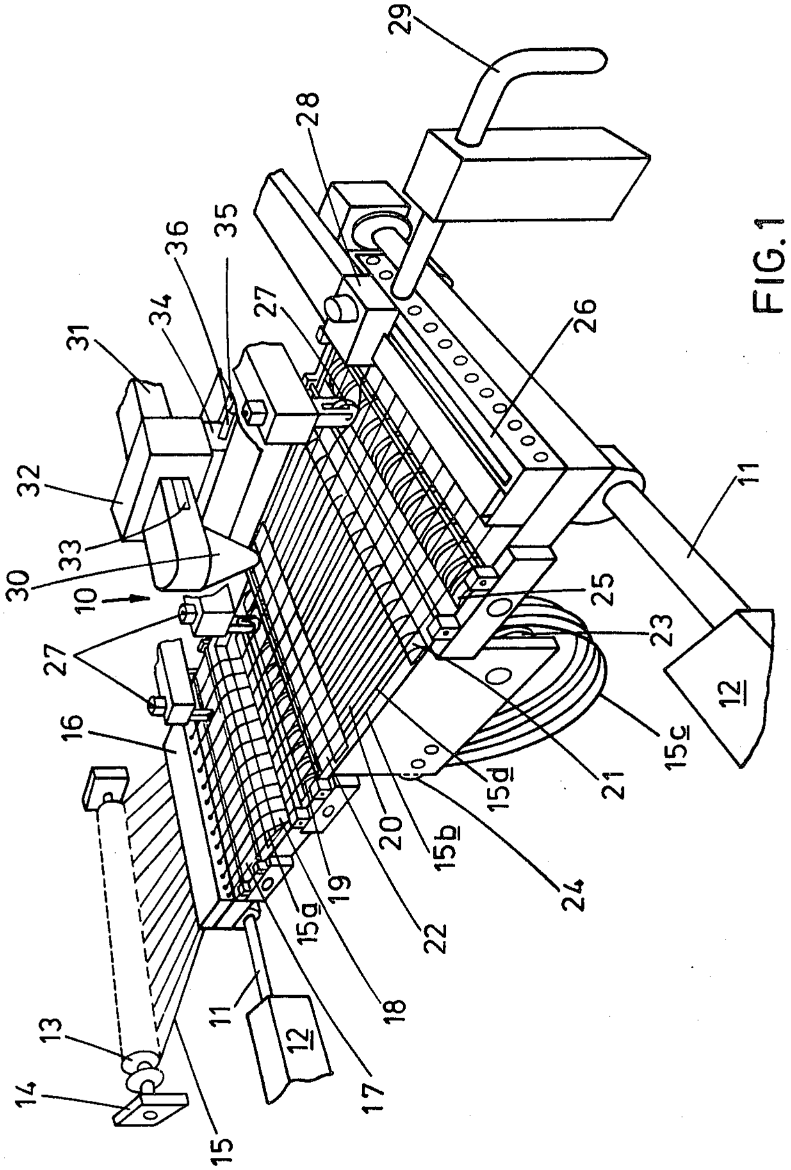

This invention relates to a method and apparatus for use in marking an identification at intervals along a length of cable.

It has been proposed to utilise a laser to mark identification markings on cables such as electric cables by burning an outer insulation layer so that the markings are rendered visible due to the contrasting colour of an inner insulation layer. The potential high speed output of the laser may not be utilised fully in existing apparatus due to limitations imposed by the number of digits required, the frequency of the markings, the need to mark cables of different types and sizes and the set-up time required in changing from one type and size of cable to another.

Accordingly, in one aspect, the invention provides a method of marking an identification at pre-selected intervals along a cable length by laser marking means comprising the steps of arranging the cable with two longitudinally spaced-apart portions located across a marking platen, sequentially moving the respective portions along the platen and positioning and operating the laser marking means to mark a stationary one of said cable portions while said other cable portion is being moved across the platen.

Preferably, the method comprises the further steps of routing the cable across an upper surface of the platen, around beneath a lower surface of the platen in an unrestrained loop and back across the upper surface so that said spaced-apart cable portions are located in parallel juxtaposed relationship on the platen upper surface.

In another aspect, the invention provides apparatus for marking an identification at selected intervals along a cable length by laser marking means and including drive means adapted during use to sequentially move two longitudinally spaced-apart portions of the cable length along a marking platen and positioning means adapted to establish an operative relationship between the laser marking means and a stationary one of the cable portions.

In yet another aspect, the invention provides apparatus for marking an identification at selected intervals along a cable length comprising a carriage block assembly including a marking platen and laser operated marking means positioned above the platen, wherein input and output portions of a cable length are routed longitudinally across the platen in substantially parallel juxtaposed relationship, and including drive means to sequentially move the input and output portions across the platen and positioning means to alternately position the laser marking means laterally in operative relationship with a stationary one of the cable portions.

Preferably, apertures are provided through the carriage block assembly upstream and downstream of the marking platen, the input portion of the cable being routed longitudinally across the platen and down through the downstream aperture to form an unrestrained loop portion beneath the platen, the cable being routed from the loop portion up through the upstream aperture to the output portion.

The drive means may comprise driven rollers carried by the carriage block assembly and located upstream and downstream respectively of the marking platen. Preferably, the driven rollers are spaced-apart vertically below the cable length and are operatively associated with idling rollers supported above the cable length and selectively moveable downwardly into contact with the respective driven roller to press the cable on to the surface of said driven roller.

Conveniently, a plurality of cable lengths are located along the carriage block assembly in spaced-apart substantially parallel relationship, the carriage block assembly being moveable laterally so as to locate a selected one of the cables beneath the idling rollers and the laser marking means.

The cables may be individually located through apertures in guide block assemblies located upstream and downstream of the driven rollers, the cables being drawn from cable reels located on a cable support means at one end of the apparatus adjacent the upstream guide block assembly. Conveniently, the downstream guide block assembly incorporates cable measuring means to measure the length of cable passing through the guide block, and may be operatively associated with a guillotine to cut the cable to a desired length.

Cable guide means may be provided at the downstream end of the carriage block assembly and may be arranged to guide the marked cable into a cable receptacle means as it leaves the downstream guide block assembly.

Preferably, the driven rollers, idling rollers, positioning of the guide block assembly and positioning and operation of the laser marking means are controlled by a pre-programmed micro-processor.

In yet another aspect, the invention provides apparatus for marking an identification at selected intervals along a cable length comprising a carriage block assembly including a marking platen and a laser operated marking means positioned above the platen, apertures located upstream and downstream of the platen, an input portion of the cable being located along the platen through the downstream aperture and up through the upstream aperture so as to form a slack loop portion below the platen, an output portion being located across the platen in parallel juxtaposed relationship with the input portion, drive means arranged to sequentially move the input and output cable portions and control means arranged to operate the drive means and the laser means and to position the laser means in a position to mark a stationary one of the input and output portions.

In yet a further aspect, the invention provides cable processing apparatus for marking an identification at desired intervals along a length of cable and comprising a carriage block assembly including a marking platen, apertures at upstream and downstream ends of the platen, an input portion of the cable being routed across the platen, down through the downstream aperture and up through the upstream aperture to form a loop portion below the platen, an output portion of the cable being routed across the platen in parallel juxtaposed relationship to the input portion, first drive means adapted to drive the input portion of the cable across the surface of the platen, second drive means arranged to draw the output portion of the cable from the surface of the platen, a laser operated marking means positioned above the platen so as to be capable of longitudinal movement relative to the platen and of lateral movement at least sufficient to encompass the input and output portions of the cable, and control means adapted to control sequential operation of the first and second drive means and to alternately position the marking means above a stationary one of the input and output portions of the cable.

The invention will now be described by way of example only and with reference to the accompanying drawings, in which, FIG. 1 is a fragmentary perspective illustration of a cable marking apparatus constructed in accordance with this invention, and FIGS. 2A to 2F inclusive are schematic drawings illustrating operational features of the apparatus of FIG. 1.

Referring now to FIG. 1, apparatus for marking an electric cable with a desired identification at selected intervals throughout its length comprises a carriage block assembly generally indicated at 10.

The carriage block assembly 10 is mounted on two ballscrews 11, one at each end thereof, the ballscrews being operated by electric motors 12 to selectively position the assembly 10 laterally. A plurality of cable reels 13 are located on a support stand 14 spaced-apart longitudinally from one end of the assembly 10, and cable 15 from each reel 13 is located through respective apertures in an upstream guide block assembly 16 located adjacent the one end of the assembly 10.

Each of the cables 15 follows an identical longitudinal path along the carriage block assembly 10, and this will now be described in relation to the particular cable identified by reference numeral 15 in FIG. 1.

From guide block 16, the cable 15 passes over a driven roller 17 powered by an electric motor (not shown). The cable then hangs loosely at 15*a* across an aperture 18 in the carriage 10, and extends across a second driven roller 19. An input portion 15*b* of the cable is located longitudinally across a marking platen 20 and is routed downwardly through a lateral aperture 21 downstream of the platen 20 to form a slack loop portion 15*c* below the platen 20. The cable re-emerges through a second aperture 22 upstream of the platen 20 and an output portion 15*d* of the cable is again located along the marking platen 20 and parallel to input portion 15*b*.

Thus, each one of the plurality of cables 15 has longitudinally spaced-apart input and output portions located across the surface of the marking platen 20 in parallel juxtaposed relationship, with an unrestrained loop portion 15*c* provided between the input and output portions 15*b* and 15*d*.

Adjacent each end of the loop portion 15*c* of the cable run, the cable is located over spaced-apart driven rollers 23 and 24, each of which is operatively associated with an idling roller set (not shown). From the platen 20, the cable is located across a further driven roller 25 and its free end is located in an aperture in a downstream guide block assembly 26 located laterally at an extremity of the assembly 10.

In this at rest condition the cable 15 is spaced-apart vertically above the driven rollers 17, 19 and 25, and each driven roller is provided with circumferential grooves to locate the cable as it passes through the apparatus. Similarly, the upper surface of the platen 20 is provided with parallel grooves for locating the respective cable portions.

Three idling rollers 27 are supported vertically above the driven rollers 17, 19 and 25 respectively, and are servo-operated so as to be moveable vertically relative the respective driven rollers. Further servo-operated idling rollers (not shown) are operatively associated with driven rollers 23 and 24 in a similar manner. The rollers 27 are fixed relative the carriage block assembly 10, those located upstream of the platen 20 being aligned longitudinally so as to engage with the same one of the cables 15 during operation. The roller 27 downstream of the platen 20 is offset laterally from the upstream rollers so as to aligned with the output portion 15*d* of the same cable 15.

The guide block 26 incorporates cable measuring means and is slidably mounted in a guillotine 28 supported in longitudinal alignment with the downstream roller 27. A cable guide tube 29 is supported in alignment with the guillotine 28 so that one end is aligned vertically with the apertures in guide block 26 and the other end is located so as to guide the cable into a cable receptacle (not shown).

A laser operated marking means 30 is positioned above the marking platen 20 and is independently moveable longitudinally of the platen 20 to mark the cable, and laterally of the platen 20 to an extent necessary to encompass both of portions 15*b* and 15*d* of a cable located along the platen 20. To this end, the laser marking means 30 is carried at an end of an arm 31 slidably mounted laterally of the carriage block assembly 10 in a housing 32. A toothed rack 33 is fixed to the arm 31 and is engaged by an electrically driven pinion (not shown) located in the housing 32. The housing 32 is supported by guide means 34 located in a trackway 35 parallel to the carriage block assembly 10 and is operatively associated with a threaded screw 36 rotatable by an electric motor (not shown). By these means, the laser marking head 30 is moveable laterally and longitudinally relative the carriage block assembly 10.

The motors 12, driven rollers 17, 19, 23, 24 and 25, the idling rollers 27, the guillotine 28 and the positioning and functioning of the laser marking means 30, are preferably controlled by a micro-processor (not shown) programmed to operate the various items in a particular sequence as hereinafter described.

In operation of the apparatus of this invention, the motors 12 are energised so as to move the assembly 10 laterally to position a desired one of the plurality of cables 15 beneath the aligned idling rollers 27. It will be apparent that this positioning of the assembly 10 also serves to bring the laser marking means 30, the guillotine 28 and the cable guide tube 29 into functional alignment with the same one of the plurality of cables 15. The idling rollers 27 are moved vertically downwardly so as to press the desired cable 15 into its circumferential groove in the driven rollers 17, 19 and 25. The further idling rollers (not shown) are simultaneously moved into a similar operational relationship with driven rollers 23 and 24.

Energisation of any of the driven rollers 17, 19, 23, 24 and 25 will result in longitudinal movement of the particular cable 15, and the sequence of such energisation as well as the sequence of position adjustment and energisation of the laser marking means will now be described with reference to FIGS. 2A to 2F inclusive of the accompanying drawings.

In the drawings, identification markings being printed on the input portion 15*b* are shown in broken line, and those printed on the output portion 15*d* in full line. Also it will be understood that although shown vertically spaced-apart for illustrative purposes, the input and output portions 15*b* and 15*d* respectively are in fact horizontally spaced-apart as hereinbefore described and as illustrated in FIG. 1, and movement of the laser head 30 between the two portions consists of a horizontal movement and not a vertical movement as illustrated. Also, it is to be understood that powered rollers 19 and 23 and rollers 24 and 25 are operated simultaneously in order to maintain the input and output portions 15*b* and 15*d* taut across marking platen 20.

The laser marking means 30 is positioned and energised to mark the programmed identification on the input portion 15*b* of the cable with both driven rollers 19 and 25 stationary. The laser means 30 is automatically repositioned laterally of the platen 20 as depicted schematically at FIG. 2B to mark the output cable portion 15*d* and, simultaneously, the driven rollers 19 and 23 are energised to drive the cable forward by a distance equal to two pitches of the identification markings.

Figure 2A:
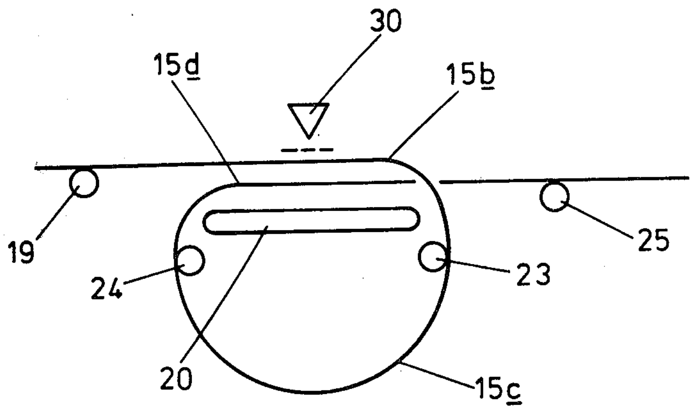
Figure 2B:
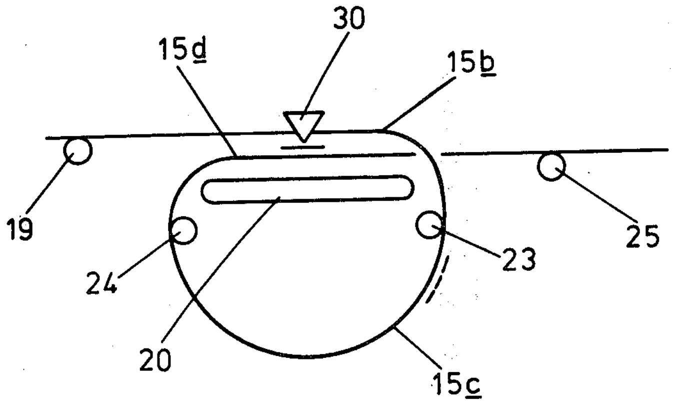
Figure 2C:
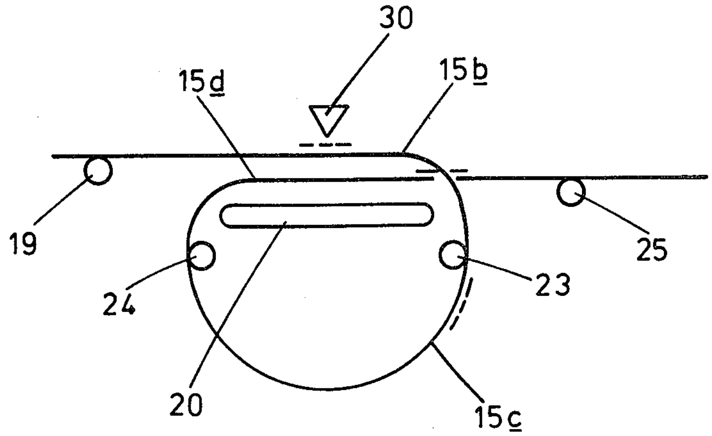

At FIG. 2C, the laser means 30 has been moved back to mark a second identification marking on the input portion 15*b* and, simultaneously, driven rollers 24 and 25 are energised to advance the output portion 15*d* forward by a distance equal to one pitch.

Thus, the output cable portion 15*d*, i.e. that leaving the platen 20 and moving towards the downstream guide block 26 is marked at one pitch intervals whereas the input cable portion 15*b* which is being fed into the loop portion 15*c* is marked at two pitch intervals.

Figure 2D:
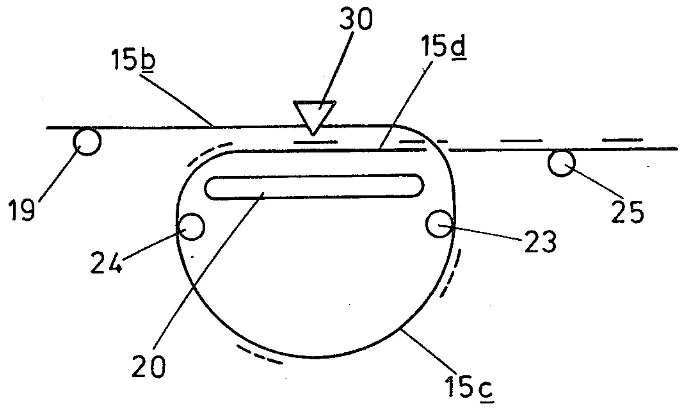
Figure 2E:
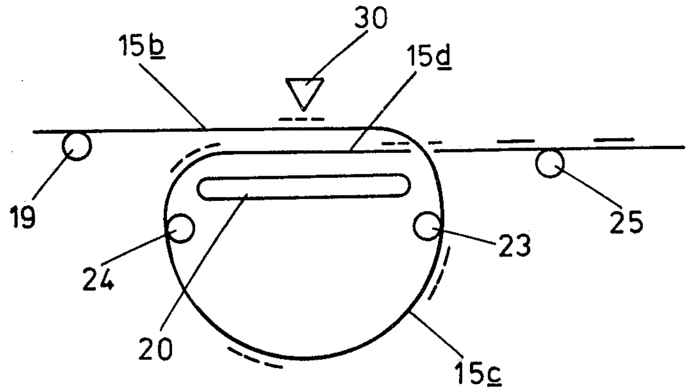

This sequence continues until the complete loop portion 15*c* is marked at two pitch intervals and until the first identification marking has moved through the loop portion 15*c* so as to be spaced one pitch distance behind the identification being marked on the output portion 15*d*, as illustrated in FIG. 2D.

Control of the driven rollers 24 and 25 is then adjusted automatically so that when the laser means 30 is moved to mark the next identification on the input portion 15*b* (FIG. 2E), the rollers 24 and 25 are energised simultaneously to move the output portion 15*d* forward by two pitches.

Figure 2F:
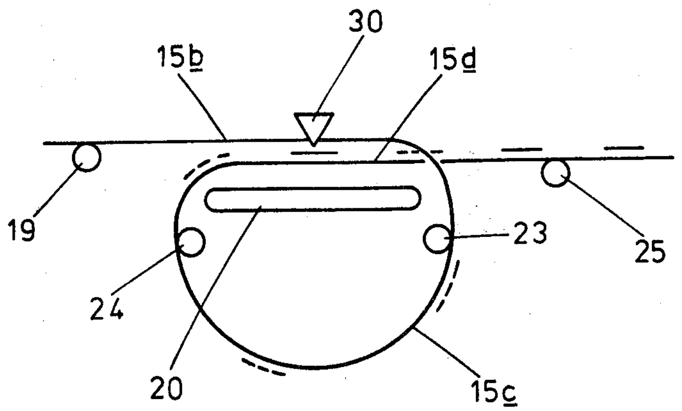

Thus, in the next operation, the laser means 30 marks the output portion 15*d*, intermediate two markings applied to the input portion 15*b* that have traversed the loop portion 15*c* as illustrated in FIG. 2F. This sequence, with the driven rollers 19 and 23 and driven rollers 24 and 25 being alternately activated to feed the cable forward by a distance equal to two pitches, results in a fully marked cable 15 (i.e. marked at one pitch intervals) moving towards the block 26, and is continued until the pre-programmed length of the particular cable has been marked.

The length of cable moving through guide block 26 is sensed by the measuring means (not shown) which functions to initiate operation of the guillotine 28 to cut the cable to the desired length.

It will be clear that the next time that the particular cable 15 is selected for marking as part of another set of cables, provided the required identification is the same, the single pitch sequence of driven rollers 24 and 25 and output portions 15*d* need not be repeated since the length of cable between platen 20 and the downstream guide block 26 will already have been marked.

In order to mark the next one of a desired set of cables, the idling rollers 27 are released and the assembly 10 is moved laterally until the next selected one of the cables 15 is located beneath the idling rollers 27. The above sequence of operations is then repeated to mark the next desired cable.

From the guide block 26, the cable being marked runs through the cable guide tube 29 and exits into a cable receptacle (not shown) but which preferably is constructed to house a complete kit of cables segregated in a desired sequence to facilitate subsequent operations.

The slack in each of the cables 15 provided by the cable hanging across the aperture 18 serves to reduce the inertia effects in the cable due to the movement imparted by driven roller 19 and, if desired, the cable support 14 can be provided with tensioning devices operative on the individual cable reels 13 to further reduce inertia and to prevent overrun of the cable reels 13 as the cable 15 is being drawn from the reel.

Thus, in the apparatus of the present invention, the cable being processed is continuously moved along the carriage block assembly although the particular portion of the cable length actually being marked is always stationary. Since all of the different cable types of a particular assembly are permanently threaded through the apparatus, the access time required to change from processing one cable type to another is reduced to a minimum. These features combine to maximise the output of the apparatus of this invention whilst retaining the facility for efficient laser marking since the portion of cable actually being marked is always stationary.

What is claimed is:

1. A method of marking an identification at preselected intervals along a cable length by laser marking means comprising the steps of arranging the cable with two longitudinally spaced-apart portions located in generally parallel juxtaposed relationship across a marking platen, sequentially moving an alternate one of the cable portions along the platen whilst maintaining the other portion stationary, and positioning and operating the laser marking means to mark a desired identification on the stationary one of said cable portions while said other cable portion is moving across the platen.

2. The method of claim 1 further comprising the steps of locating said cable across an upper surface of the platen, around beneath a lower surface of the platen in an unrestrained loop and back across the upper surface of the platen so that said parallel juxtaposed, spaced-apart cable portions are established on the upper surface of the platen.

3. Apparatus for marking an identification at preselected intervals along a cable length by laser marking means and including drive means adapted during use to sequentially move an alternate one of two longitudinally spaced-apart portions of the cable length which are located in parallel juxtaposed relationship along a marking platen while maintaining the other portion stationary, and positioning means adapted to establish an operative relationship between the laser marking means and the stationary one of the cable portions whereby the stationary portion is marked while the other cable portion is moving across the platen.

4. Apparatus for marking an identification at preselected intervals along a cable length comprising a carriage block assembly including a marking platen and laser operated marking means positioned above the platen, wherein longitudinally spaced-apart input and output portions of a cable length are routed across the platen in substantially parallel juxtaposed relationship, said apparatus including drive means to sequentially move an alternate one of the input and output portions across the platen while maintaining the other portion stationary and positioning means to alternately position the laser marking means in operative relationship with the stationary one of the cable portions whereby the stationary portion is marked while the other cable portion is moving across the platen.

5. Apparatus as claimed in claim 4, wherein apertures are provided through the carriage block assembly upstream and downstream of the marking platen, the input portion of the cable being routed longitudinally across the platen and down through the downstream aperture to form an unrestrained loop portion beneath the platen, the cable being routed from the loop portion up through the upstream aperture to the output portion.

6. Apparatus as claimed in claim 4 or claim 5, wherein said drive means comprise driven rollers carried by the carriage block assembly and located upstream and downstream respectively of the marking platen.

7. Apparatus as claimed in claim 6, wherein said drive rollers are spaced-apart vertically below the cable length and are operatively associated with idling rollers supported above the cable length and selectively moveable downwardly into contact with the respective driven roller to press the cable on to the surface of said driven roller.

8. Apparatus as claimed in claim 4 or claim 5, and including a plurality of cable lengths located along the carriage block assembly in spaced-apart substantially parallel relationship.

9. Apparatus as claimed in claim 8, wherein said carriage block assembly is moveable laterally to locate a selected one of the cables beneath the idling rollers and the laser marking means.

10. Apparatus as claimed in claim 8, wherein the cable are individually located through apertures in guide block assemblies located upstream and downstream of the driven rollers.

11. Apparatus as claimed in claim 10, wherein the cables are drawn from individual cable reels located in a cable support means located at an end of the apparatus adjacent the upstream guide block assembly.

12. Apparatus as claimed in claim 10, wherein said downstream guide block assembly incorporates cable measuring means.

13. Apparatus as claimed in claim 10, wherein a guillotine is operatively associated with said downstream guide block assembly.

14. Apparatus as claimed in claim 10, wherein cable guide means is provided downstream of said downstream guide block assembly, said guide means being adapted to guide the cable into a cable receptacle.

15. Apparatus for marking an identification at selected intervals along a cable length comprising a carriage block assembly including a marking platen and a laser operated marking means positioned above the platen, wherein apertures are provided upstream and downstream of the platen and an input portion of the cable is located along the platen through the downstream aperture and up through the upstream aperture to form a slack loop below the platen, an output portion of the cable being located across the platen in parallel juxtaposed relationship with the input portion, and including drive means arranged to sequentially move an alternate one of said input and output cable portions while maintaining the other portion stationary, and control means arranged to operate said drive means and said laser means and to position said laser means so as to mark the stationary one of said input and output portions whereby the stationary portion is marked while the other cable portion is moving across the platen.

16. Apparatus for marking an identification at selected intervals along a length of cable and comprising a carriage block assembly including a marking platen, apertures at upstream and downstream ends of the platen, an input portion of the cable being routed across the platen, down through the downstream aperture and up through the upstream aperture to form a loop portion below the platen, an output portion of the cable being routed across the platen in parallel juxtaposed relationship to the input portion, first drive means adapted to drive the input portion of the cable across the surface of the platen, second drive means arranged to draw the output portion of the cable from the surface of the platen, a laser operated marking means positioned above the platen so as to be capable of longitudinal movement relative to the platen and of lateral movement at least sufficient to encompass the input and output portions of the cable, and control means adapted to control sequential operation of the first and second drive means such that an alternate one of the input and output cable portions is sequentially moved while the other portion is maintained stationary and to alternately position the laser marking means above the stationary one of said input and output portions of the cable.

* * * * *